United States Patent
Maruyama et al.

[11] Patent Number: 5,181,575
[45] Date of Patent: Jan. 26, 1993

[54] IMPACT WRENCH HAVING TORQUE CONTROLLING FACULTY

[75] Inventors: Junichi Maruyama; Teruo Fukumura, both of Yokohama; Sadatsugu Kawaguchi, Osaka, all of Japan

[73] Assignees: Nissan Morot Co., Ltd., Yokohama; Uryu Siesaku, Ltd., Osaka, both of Japan

[21] Appl. No.: 848,144

[22] Filed: Mar. 9, 1992

[30] Foreign Application Priority Data

Mar. 7, 1991 [JP] Japan .................. 312370[U]

[51] Int. Cl.$^5$ ............................................ B25B 23/14
[52] U.S. Cl. ................................. 173/180; 173/181; 81/470
[58] Field of Search ............ 173/176, 177, 180, 181, 173/182, 183; 81/467, 469, 470

[56] References Cited

U.S. PATENT DOCUMENTS

| | | |
|---|---|---|
| 3,572,447 | 3/1971 | Pauley et al. ............. 173/12 |
| 3,710,874 | 1/1973 | Seccombe et al. ............. 173/182 |
| 3,926,264 | 12/1975 | Bardwell et al. ............. 173/182 |
| 3,975,954 | 8/1976 | Barnich ............. 173/182 |
| 4,142,591 | 3/1979 | Himmelstein ............. 173/182 |
| 4,281,538 | 8/1981 | Dudek ............. 73/862.21 |
| 4,418,765 | 12/1983 | Mari et al. ............. 173/182 |
| 4,648,282 | 3/1987 | Alender et al. ............. 173/183 |

FOREIGN PATENT DOCUMENTS 0366217 5/1990 European Pat. Off. .
61-4676 1/1986 Japan .

*Primary Examiner*—Douglas D. Watts
*Assistant Examiner*—Scott A. Smith
*Attorney, Agent, or Firm*—Foley & Lardner

[57] ABSTRACT

An impact wrench with a torque controlling faculty including an air motor for generating a primary torque, an oil pressure pulse generating unit for converting the primary torque into a pulsatory secondary torque, a main spindle to which the pulsatory secondary torque is applied, a transducer for detecting the pulsatory secondary torque and a shut-off valve which is closed to stop a supply of a compressed air to the air motor when the secondary torque exceeds a predetermined threshold value. The main spindle is made of material having the magnetic strictive effect and the distortion of the main spindle is detected by a pair of coils arranged in opposition to the main spindle. The coils are connected into a bridge circuit together with resistors and an exciting current having a sinusoidal waveform is supplied to a first set of diagonal points of the bridge circuit. A voltage appearing across a second set of diagonal points is detected to produce a torque detection signal which represents the pulsatory secondary torque. Then the torque detection signal is sampled and held at a predetermined phase which is fixedly related to a phase of the exciting current to produce a torque measurement signal which represents a peak value of the pulsatory secondary torque applied to the main spindle.

9 Claims, 9 Drawing Sheets

FIG_1

FIG_3

FIG_4

FIG_5

FIG_6

$\theta_A$: Minimum Value Phase
$\theta_B$: Maximum Value Phase
$\theta_S$: Sample-hold Phase

FIG_7

FIG_8

IMPACT WRENCH HAVING TORQUE CONTROLLING FACULTY

BACKGROUND OF THE INVENTION

Field of the Invention

The present invention relates to a torque wrench in which a clamping torque of a main spindle can be controlled, and more particularly to an impact wrench or oil pulse wrench comprising an air motor unit having a driving shaft, an oil pressure pulse generating unit for converting a driving torque of the driving shaft into a pulsatory torque, and a main spindle which is rotated in a pulsatory manner by means of the pulsatory torque generated by the oil pulse generating unit.

There have been proposed various types of the above mentioned impact wrench with the torque controlling faculty. In such an impact wrench, a torque applied to a main spindle is detected and when the detected torque exceeds a predetermined threshold value, a shut-off valve provided in an air conduit for supplying a compressed air to an air motor is closed to stop the rotation of the main spindle. For instance, in Japanese Utility Model Application Laid-open Publication Jikkai Sho 61-81878, there is described a known impact wrench with the torque controlling faculty, in which a planetary reduction gear is arranged between an output shaft of an oil pressure pulse generating unit and a main spindle to which a tool is detachably secured and a ring gear is formed in an inner wall of a gear casing of the planetary reduction gear such that the ring gear is engaged with the planetary reduction gear. A strain gauge is applied on an outer surface of the gear casing and a clamping torque applied to the main spindle is measured by processing an output signal of the strain gauge.

In this known impact wrench, since use is made of the planetary gear mechanism, it is impossible to detect the torque applied to the main spindle directly. Further, an operator of the impact wrench is subjected to a rather large repelling force of the gear casing.

In Japanese Patent Application Laid-open Publication Kokai Sho 61-4676, there is described another known impact wrench having the torque controlling faculty, in which a strain gauge is directly applied on a main spindle and an output signal of the strain gauge is taken out by means of a rotary transformer whose primary coil and secondary coil are provided on the main spindle and a main housing of the impact wrench, respectively.

In this known impact wrench, the torque of the main spindle can be directly detected without making contact with the main shaft, so that the repelling force applied to the operator can be made small, but the strain gauge and the primary coil of the rotary transformer are secured to the main spindle which is rotated at a very high speed, so that they are liable to be pealed off the main spindle. Therefore, the fluctuation of the detected torque is very large and the accuracy of the torque measurement might be reduced within a relatively short time period.

SUMMARY OF THE INVENTION

The present invention has for its object to provide a novel and useful impact wrench having the torque controlling faculty, in which the torque of the main spindle can be detected in a non-contact manner and the reduction of the torque detection accuracy can be avoided for a long time, while the repelling force applied to the operator can be decreased.

According to the invention, an impact wrench having a torque controlling faculty comprises:

a main housing;

an air motor unit arranged within said main housing for generating a primary torque;

an air supply unit including an air conduit formed within said main housing for supplying a compressed air to said air motor;

a shut-off valve provided in said air supply unit;

a main spindle arranged rotatably and made of material having a magnetic strictive effect;

a torque converting means arranged between said air motor and said main spindle for converting said primary torque produced by said air motor into a secondary torque which is applied to said main spindle;

a transducer unit for detecting a change in the permeability of a surface portion of said main spindle to produce a torque detection signal which represents a pulsatory change of a torque applied to said main spindle;

a signal processing circuit for sampling and holding said torque detection signal at a predetermined constant phase to generate a torque measurement signal; and a control circuit for receiving said torque measurement signal to produce a valve cut command when the torque measurement signal exceeds a predetermined threshold value; and a means for closing said shut-off vale in response to said valve cut command to stop the supply of the compressed air to said air motor.

According to further aspect of the present invention, an impact wrench with the torque controlling faculty comprises:

a main housing; material having a magnetic strictive effect;

an air motor unit including an eccentric cylinder, a rotary driving shaft arranged rotatably within said eccentric cylinder and vanes secured to said rotary driving shaft;

an air supply unit including an air conduit for supplying a compressed air to said eccentric cylinder of the air motor unit to rotate said rotary driving shaft;

a shut-off valve provided in said air supply unit for selectively cutting a supply of the compressed air to said eccentric cylinder of the air motor unit;

an oil pressure pulse generating unit provided between said main spindle and said rotary driving shaft of the air motor unit for converting the rotating force of the rotary driving shaft into a pulsatory driving force which is applied to said main spindle and has a first frequency;

a transducing means including a magneto-electric converting means for detecting a change in a permeability of a surface portion of the main spindle, an exciting current generating means for generating an exiting current which is supplied to said magneto-electric converting means and has a predetermined second frequency which is higher than said first frequency, and a detecting circuit connected to said magneto-electric means for detecting a change of said exciting current to produce a torque detection signal which represents a pulsatory change of a torque applied to said main spindle;

a signal processing circuit connected to said detecting circuit for sampling and holding said torque detection signal at a predetermined constant phase to generate a torque measurement signal;

a control circuit for receiving said torque measurement signal to produce a valve cut command when the torque measurement signal exceeds a predetermined threshold value;

a pilot valve for closing said shut-off valve in response to said valve cut command; and a signal transmitting means for supplying said valve cut command to said pilot valve to close said shut-off valve.

In the impact wrench according to the present invention, the main spindle is made of material having the magnetic strictive effect, so that when a pulsatory torque is applied to the main shaft, the magnetic permeability of the surface portion of the main spindle is changed in a pulsatory manner. This change in the magnetic permeability is detected by the magneto-electric converting means such as coils, magneto-resistance element and Hall element which is secured to an inner wall of the main housing. Therefore, the torque can be detected directly without making into contact with the main spindle, and thus the repelling force applied to the operator can be reduced and the torque detection accuracy is hardly decreased for a very long time of usage. Further when the exciting current has a sinusoidal waveform, the output signal of the magneto-electric converting means has also a sinusoidal waveform whose phase relationship with respect to the exciting current is not influenced by the change of the torque. Therefore, by sampling and holding the torque detecting signal having the sinusoidal waveform at a constant phase point, the torque applied to the main shaft can be detected very precisely, and thus the torque can be controlled accurately. For instance, the torque detection signal may be sampled and held at such a phase point that the peak value of the torque detection signal is extracted.

DESCRIPTION OF THE PREFERRED EMBODIMENTS

Figure 1:
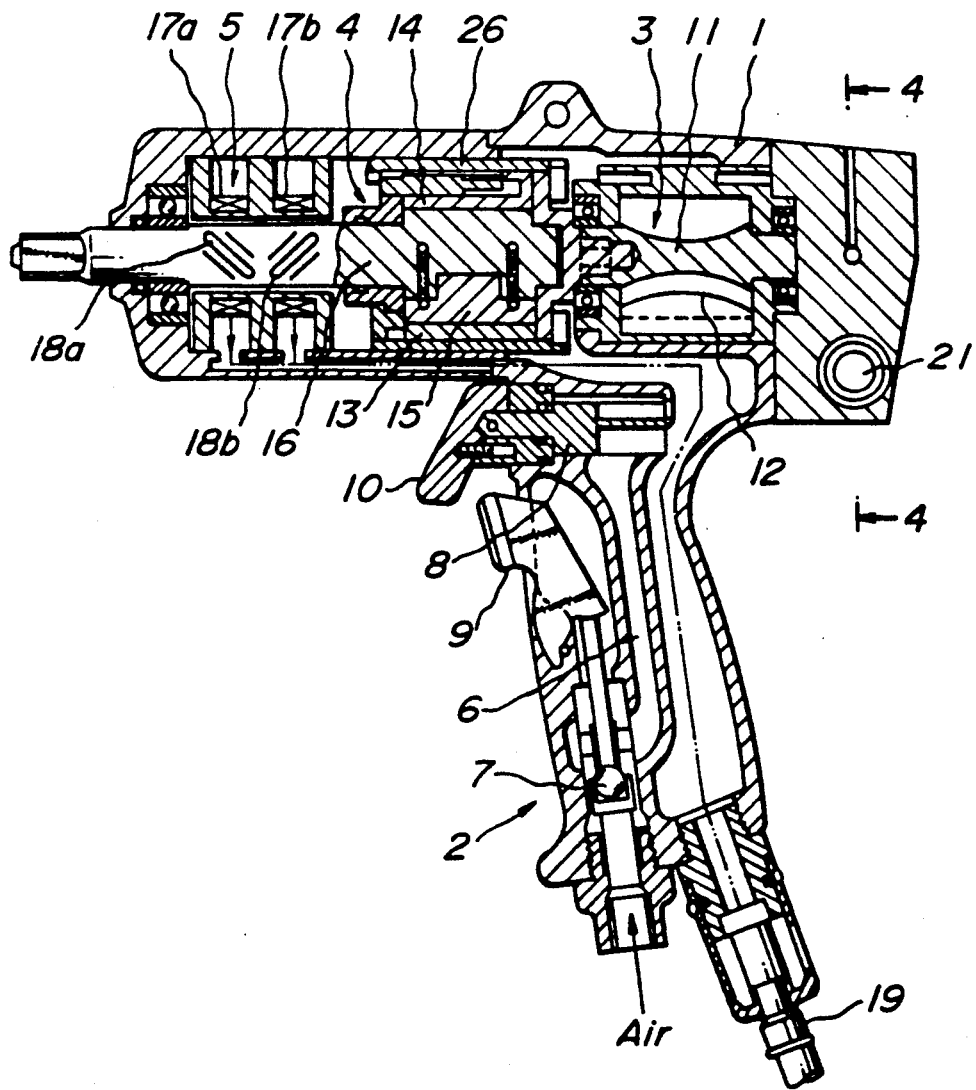
FIG. 1 is a cross sectional view showing the construction of a main portion of an embodiment of the impact wrench according to the invention.

FIG. 1 is a cross sectional view showing the construction of a main portion of an embodiment of the impact wrench with the torque controlling faculty according to the present invention. The main portion of the impact wrench comprises a main housing 1 in which there are arranged air supply unit 2, air motor unit 3, oil pressure pulse generating unit 4 and torque transducer unit 5. In the present embodiment, the main housing 1 is constructed in the form of a pistol which can be easily handled by a single hand of an operator, but it may be constructed in any other form. The construction of the air supply unit 2, air motor unit 3 and oil pressure pulse generating unit 4 is the same as that of the known impact wrench, so that it is not explained here in detail. The air supply unit 2 comprises an air conduit 6 which is communicated with the air motor unit 3. In the air conduit 6 there are provided a main valve 7 and a rotational direction changing valve 8 in this order viewed in a direction in which a compressed air is supplied to the air motor unit 3.

The main valve 7 is opened by pulling a valve operation lever 9 movably provided on the main housing 1, and the rotational direction changing valve 9 is operated by rotating a rotational direction changing lever 10 rotatably arranged on the main housing 1 between given rotational positions. The air motor unit 3 comprises a rotary driving shaft 11 which is arranged in an eccentric cylinder and is rotated by projecting an air stream against vanes 12 secured to the rotary driving shaft 11. The oil pressure pulse generating unit 4 comprises a liner casing 13 directly coupled with the rotary driving shaft 11 of the air motor unit 3, a liner 14 arranged within the liner casing and secured to the liner casing, and a driving blade 15 rotatably arranged within an inner space of the liner 14, said inner space being eccentric with respect to the liner casing 13. The driving blade 15 is connected to a main spindle 16 such that the driving blade is rotatable together with the main spindle, but is movable with respect to the main spindle in a radial direction of the main spindle. A space formed between the inner wall of the liner 26 and the main spindle 16 within the liner casing 13 is filled with an oil.

When a torque having a level exceeding a predetermined value is not applied to the main spindle 16, the main spindle 16 is rotated together with the liner casing 13, i.e. the rotary driving shaft 11 of the air motor unit 3 due to a friction between the inner wall of the liner 26 and the driving blade 15, but when a torque exceeding the predetermined value is applied to the main spindle 16, the oil pressure which is applied to the inner wall of the driving blade 15 via a relief valve 26 is changed, so that the main spindle 16 is rotated by a very strong impact force. The oil pressure pulse generating unit 4 functions to convert a primary torque generated by the air motor unit 3 into a pulsatory secondary torque which is applied to the main spindle 16. In this connection, the impact wrench of a type mentioned above is sometimes called the oil pulse wrench. A magnitude of the pulsatory secondary torque is changed by adjusting the relief valve 26.

The transducer unit 5 comprises a pair of coils 17a and 17b which are arranged around the main spindle 16 and are secured to the inner wall of the main housing 1. The main spindle 16 is made of material having the magnetic strictive effect and first and second arrays of recesses 18a and 18b are formed on the outer surface of the main spindle. The recesses 18a of the first array are inclined with respect to an axial direction of the main spindle 16 by a first inclination angle $\alpha$ and the recesses 18b of the second array are inclined with respect to the axial direction of the main spindle by a second inclination angle $-\alpha$. That is to say, the recesses 18a and 18b of the first and second arrays are formed perpendicularly to each other. The coils 17a and 17b are provided such that they are opposed to the first and second arrays of recesses 18a and 18b, respectively. Therefore, when the torque having a given direction is applied to the main spindle 16, one of the recesses 18a and 18b is stretched and the other is compressed, so that the variation of the permeability of the surface portion of the main spindle can be detected in a differential manner. In this manner, the torque applied to the main spindle 16 can be detected at a high sensitivity without making into contact with the main spindle.

Figure 2:
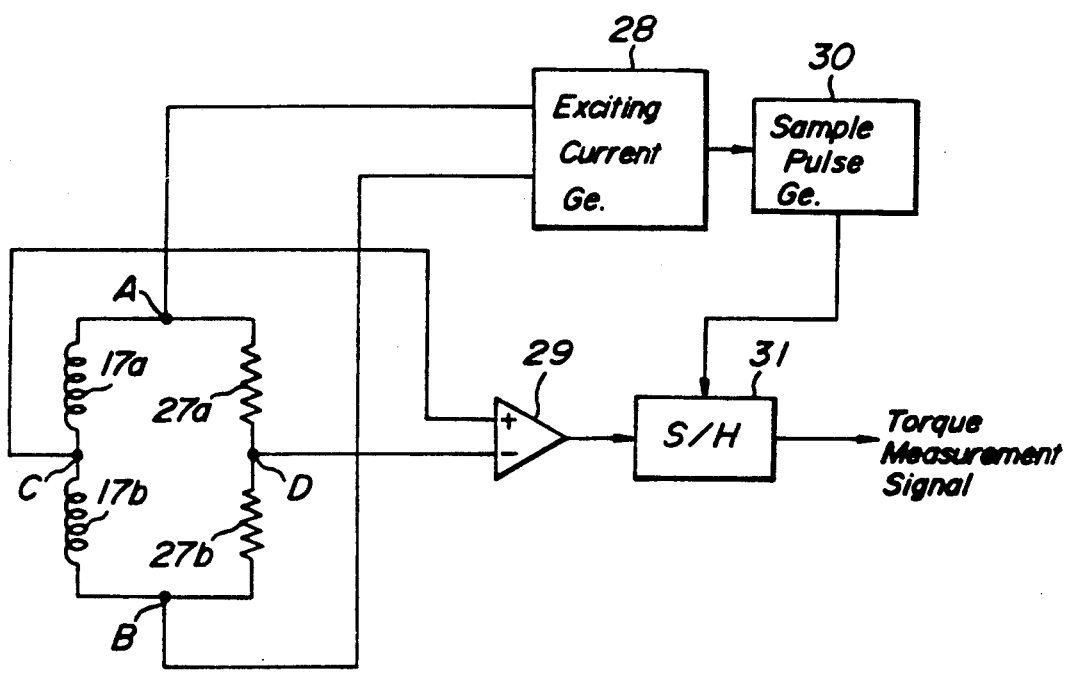
FIG. 2 is a circuit diagram illustrating a torque detection circuit of the impact wrench.

FIG. 2 is a circuit diagram showing a torque detection circuit of the impact wrench according to the invention. The coils 17a and 17b form a detection bridge circuit together with resistors 27a and 27b and junction points A and B, i.e. a first set of diagonal points are connected to an exciting current generator 28 to supply an exciting current having a given frequency to the bridge circuit. A voltage appearing across a junction point C between the coil 17a and 17b and a junction point D between the resistors 27a and 27b is detected by a differential amplifier 29 to derive a torque detection signal. That is to say, a second set of diagonal points C, D is connected to the differential amplifier 29. The exciting current generator 28 is also connected a sampling pulse generator 30 for generating a sampling pulse which is synchronized with the exciting current. The torque detection signal produced by the differential amplifier 29 is supplied to a sample and hold circuit 31 and is sampled and held by the sampling pulse supplied from the sampling pulse generator 30 In this manner, there is obtained a torque measurement signal.

The mechanism for cutting the supply of the compressed air to the air motor unit 3 is known and comprises a shut-off valve 21 for controlling the supply of the compressed air to the air motor unit 3, said shut-off valve being provided in the air conduit between the rotational direction changing valve 8 and the air motor unit 3.

Figure 3:
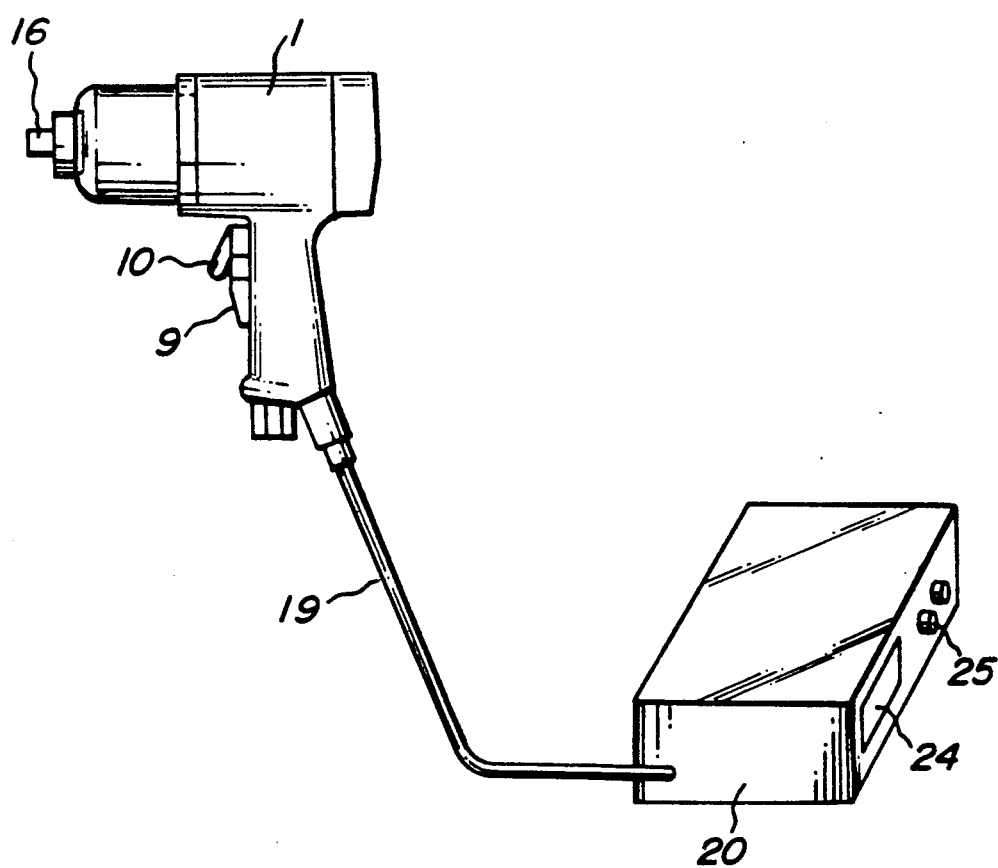
FIG. 3 is a perspective view depicting the whole construction of the impact wrench including the main portion shown in FIG. 1 and a controller.
Figure 4:
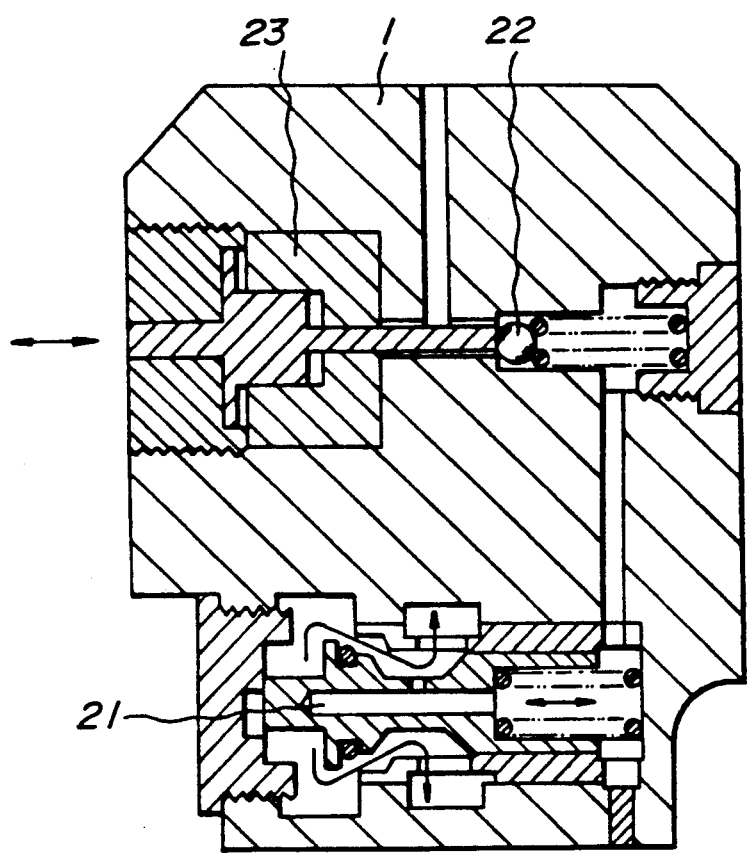
FIG. 4 is a cross sectional view cut along a line 4—4 in FIG. 1.

FIG. 3 is a perspective view showing the whole construction of the impact wrench of the present embodiment which comprises the main portion and a controller 20 coupled with the impact wrench. The coils 17a and 17b provided in the transducer unit 5 of the main portion are connected to the controller 20 by means of an electric conductor 19. The controller 20 includes a signal processing circuit 20a and a control circuit 20b for detecting the torque applied to the main spindle 16 and producing a valve cut command. It should be noted that a large part of the torque detection circuit shown in FIG. 2 is provided in the signal processing circuit 20a. The controller 20 further includes a display panel 24 for displaying the detected torque FIG. 4 is a cross sectional view cut along a line 4—4 in FIG. 1 and shows the construction of the shut-off valve 21. In FIG. 4, a reference numeral 22 denotes a pilot valve of an electromagnetic solenoid type and a reference numeral 23 represents an electro-magnet. The shut-off valve 21 is driven in conjunction with the pilot valve 22.

Figure 5:
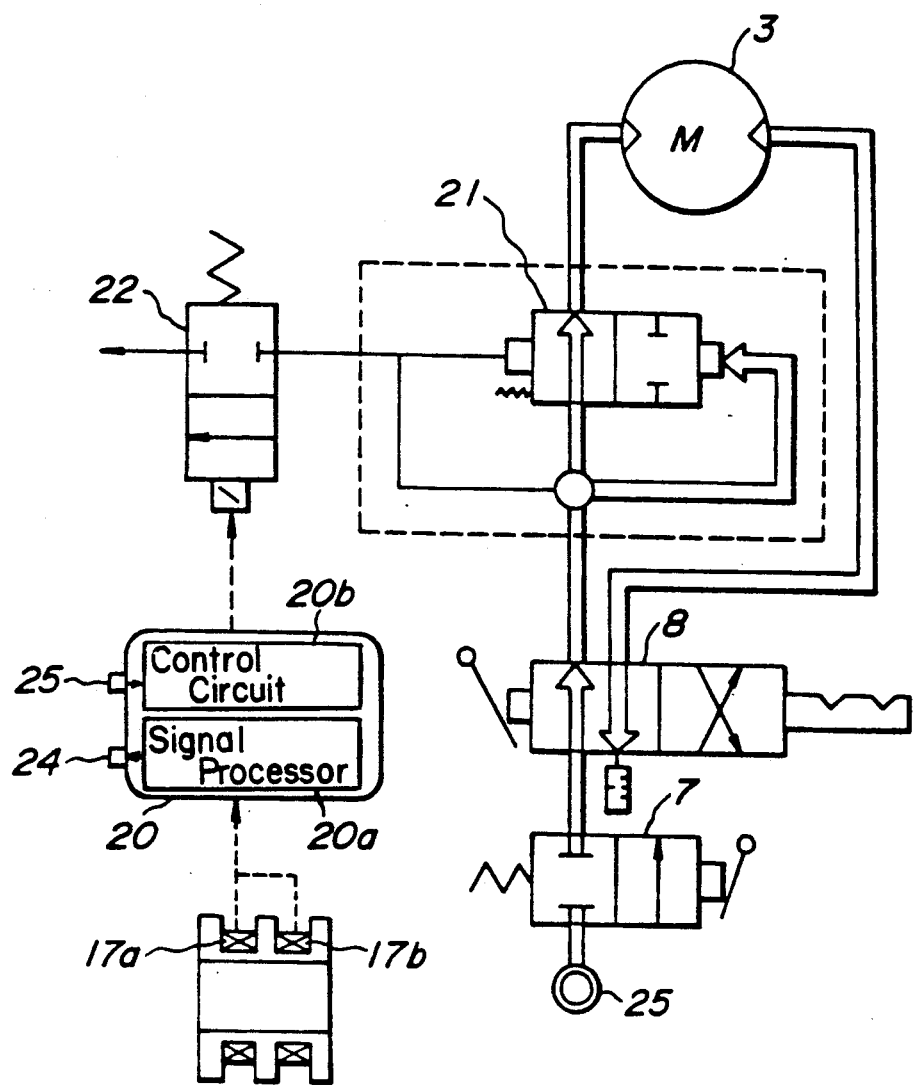
FIG. 5 is a block diagram showing an air circuit of the impact wrench shown in FIG. 1.

FIG. 5 is an air circuit diagram of the impact wrench shown in FIG. 1. When the valve operating lever 9 is pulled, the compressed air is supplied from a compressed air supply source 25 to the air motor unit 3 by means of the main valve 7, rotational direction changing valve 8 and shut-off valve 21, and the rotary driving shaft 11 of the air motor unit 3 is rotated in a given direction determined by the rotational position of the rotational direction changing lever 10. The signal processing circuit 20a of the controller 20 comprises a half of the bridge circuit (resistors 27a, 27b), the exciting current generator 28 for producing the exiting current which is supplied to the coils 17a and 17b of the transducer unit 5 by means of the electric conductor 19. The exiting current has a frequency which is sufficiently higher than a frequency of the rotation of the main spindle 16 under no load. For instance, the frequency of the exciting current may be set to 10 KHz, while the rotational speed of the main spindle 16 under no load is about 6000 rpm. The impedance of the coils 17a and 17b is changed in dependence upon the change in the permeability of the surface portion of the main spindle 16 due to the distortion of the main shaft, so that the amplitude of the sinusoidal voltage appearing across the junction points C and D of the bridge circuit is changed accordingly. The sinusoidal voltage appearing across the bridge circuit is detected by the differential amplifier 29 to produce the torque detection signal. Then, the torque detection signal is sampled and held in a manner which will be explained later to derive a torque measurement signal which represents the peak value of the torque applied to the main spindle 16. The thus derived torque measurement signal is displayed on the display panel 24 and at the same time is supplied to the control circuit 20b. In the control circuit 20b, the torque measurement signal is compared with a predetermined threshold value. When the measured torque exceeds the threshold value, the control circuit 20b generates a valve cut command, which is supplied to the electromagnet 23 of the pilot valve 22. The pilot valve 22 is opened in response to the valve cut command supplied from the controller 20 and then the shut-off valve 21 is operated to cut the supply of the compressed air to the air motor unit 3, so that the rotation of the main spindle 16 is stopped.

Figure 6:
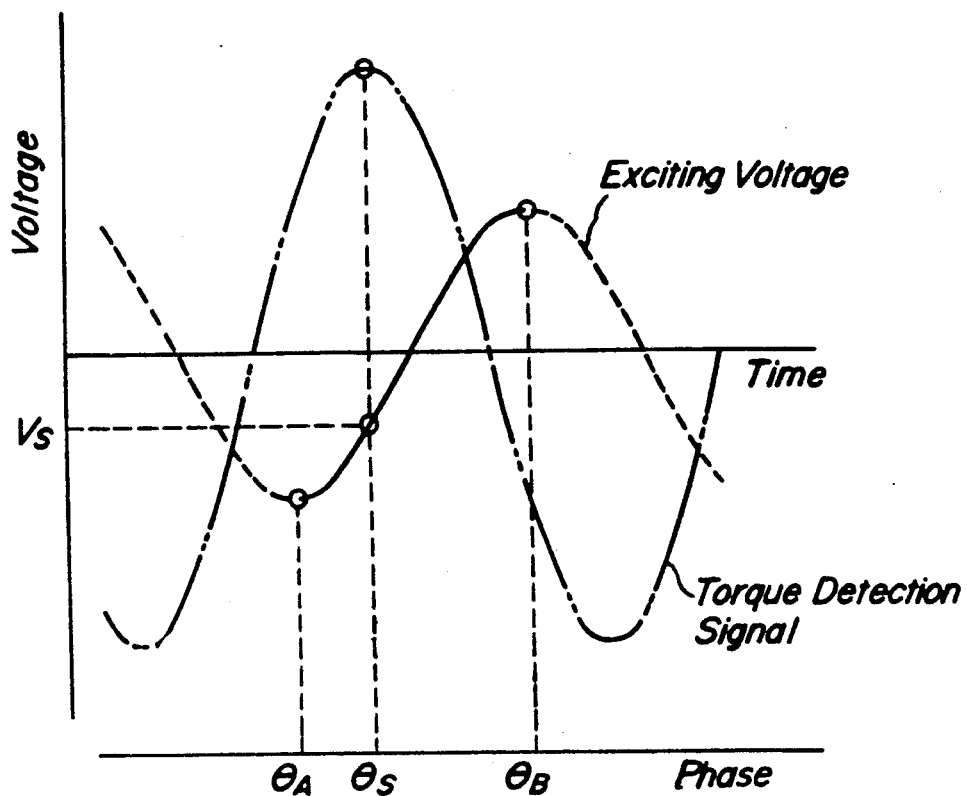
FIG. 6 is a graph representing a timing of sample and hold.

Now the operation of the signal processing circuit 20a will be explained in detail. The torque detection signal obtained by detecting the output voltage of the bridge circuit including the coils 17a, 17b of the transducer unit 5 and resistors 27a, 27b has a sinusoidal waveform, because the exciting current has a sinusoidal waveform. FIG. 6 shows a waveform of a voltage corresponding to the exiting current supplied to the bridge circuit including the coils 17a, 17b and resistors 27a, 27b and the torque detection signal supplied from the differential amplifier 29. It should be noted that the phase of the torque detection signal has a constant phase difference with respect to the exciting voltage in regardless of the value of the torque applied to the main spindle 16. According to the invention by utilizing this fact the sampling pulse generator 30 generates the sampling pulse which is synchronized with the phase of the exciting voltage. $\theta_A$ is a phase at which the exciting voltage becomes minimum and $\theta_B$ is a phase at which the exciting voltage becomes maximum A sample and hold phase is set within a range between $\theta_A$ and $\theta_B$ in which the exciting voltage is in proportion to the phase. For instance, a voltage $V_s$ is selected as a reference value and when the exciting voltage exceeds this value $V_s$, there is produced a sampling pulse at a phase angle of $\theta_S$ and the torque detection signal is sampled and held by this sampling pulse to derive the torque measurement signal. In the present embodiment, the sampling phase $\theta_S$ is set such that the peak value of the torque detection signal is detected. According to the invention, it is not always necessary to effect the sampling at such a timing, but the torque detection signal may be sampled and held at any phase which is fixedly related to the phase of the exciting voltage.

Now the operation of the impact wrench of the present embodiment will be explained.

When the valve operating lever 9 is pulled, the compressed air is supplied from the compressed air supply source 25 to the air motor unit 3 via the shut-off valve 21 which is opened, and the rotary driving shaft 11 in the air motor unit 3 is rotated in a given direction. The primary rotating force of the rotary driving shaft 11 is converted into the pulsatory secondary rotating force by the oil pressure pulse generating unit 4 and this pulsatory secondary rotating force is transmitted to the main spindle 16 to produce the clamping force.

During the clamping operation, the torque applied to the main spindle 16 is increased and the main spindle is distorted. This distortion of the main spindle 16 is detected by the coils 17a and 17b of the transducer unit 5 and the torque measurement signal is derived by the signal processing circuit 20a of the controller 20. When the measured torque exceeds the predetermined threshold value, the control circuit 20b generates the valve cut command which is supplied to the electromagnet 23 of the pilot valve 22. Then, the pilot valve 22 is opened, so that the shut-off valve 21 is closed. In this manner, the supply of the compressed air to the motor unit 3 is stopped and the rotation of the rotary driving shaft 11 is stopped. In the manner explained above, the clamping action of the main spindle 16 is completed and the clamping torque at the end of the clamping operation is displayed on the display panel 24 of the controller 20. The threshold clamping torque may be set by operating a dial 25 provided on the controller 20.

Figure 7:
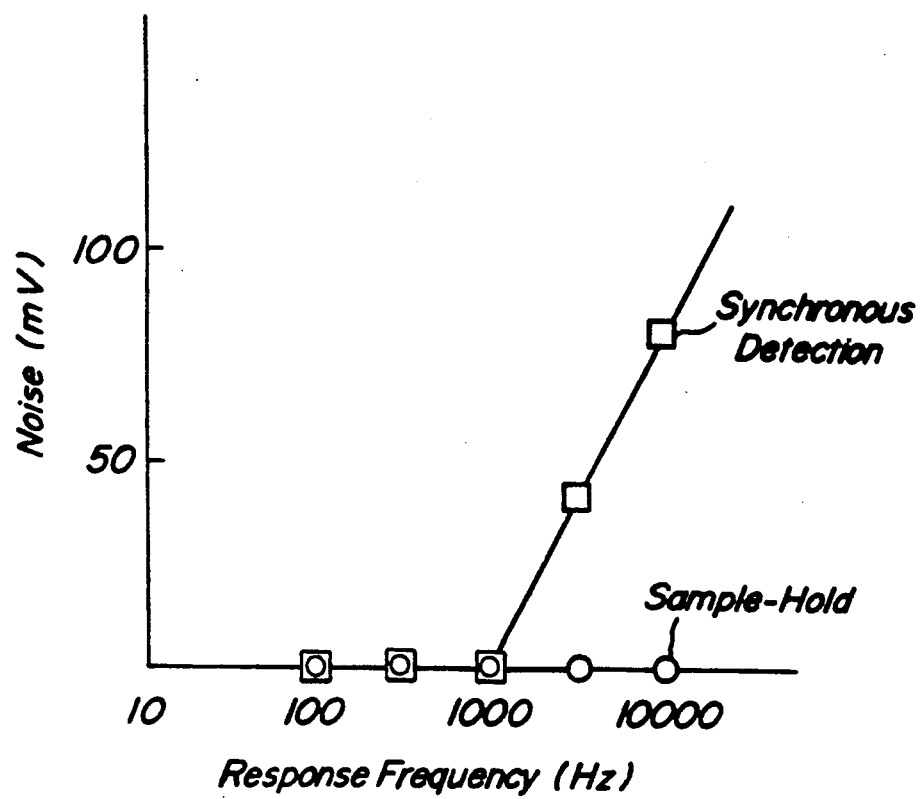
FIG. 7 is a graph showing response frequency-noise characteristics of the sample and hold detection according to the invention in comparison with the synchronous detection.

FIG. 7 shows a graph representing the mutual relationship between the frequency of the exiting current, i.e. response frequency and noise which is contained in the torque measurement signal which has been obtained by sampling and holding the torque detection signal in the manner explained above and has been transmitted through a filter. A duration of the pulsatory secondary torque applied to the main spindle 16 during the clamping operation amounts to 1 to 2 ms, so that in order to detect the peak value of the pulsatory torque precisely, the response frequency should be higher than 1 KHz. In the present embodiment, the exciting current is set to have the frequency of about 10 KHz. As shown in FIG. 7, the noise level is sufficiently low up to the response frequency of 10 KHz when the torque is detected in the manner explained above according to the invention. However, when the torque detection signal is processed by the synchronous detection to measure the torque, the noise level becomes very large, if the response frequency is increased more than 1000 Hz. Therefore, according to the present invention, the torque applied to the main spindle can be detected very precisely by using the exciting current having a sufficiently high frequency, while the influence of the noise can be avoided effectively.

Figure 8:
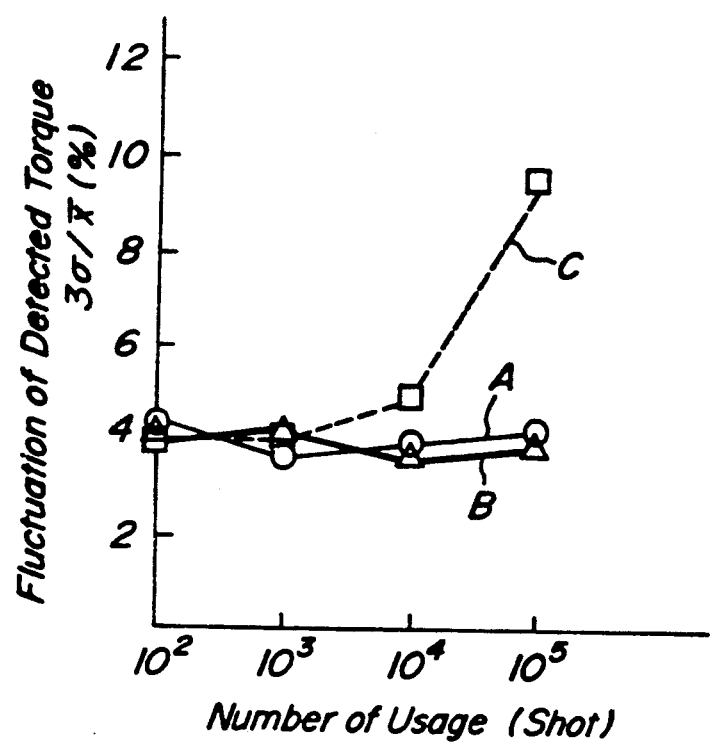
FIG. 8 is a graph showing a mutual relationship between the number of usages and the fluctuation of the detected torque.
Figure 9:
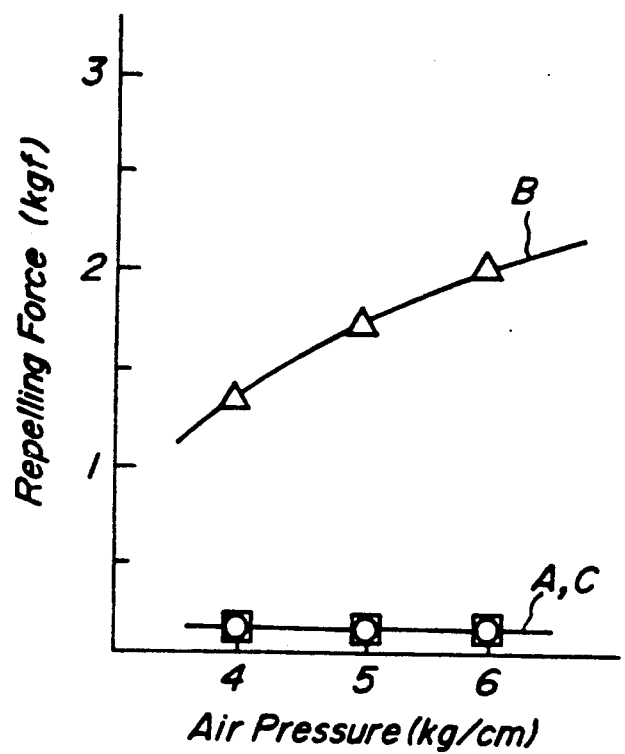
FIG. 9 is a graph illustrating a relationship between the air pressure and the repelling force.

FIG. 8 shows curves which represent the relationship between the number of usages and the fluctuation in the detected torque. The experiments were conducted by setting the threshold torque value to 5 kgm, and the fluctuation of the torque is represented by 3 $\sigma/\bar{x}$, wherein $\sigma$ is a standard error and $\bar{x}$ is an average value of the detected torque. FIG. 9 is a graph showing the relationship between the air pressure and the repelling force. In FIGS. 8 and 9, a curve A denotes characteristics of the embodiment of the present invention and curves B and C represent characteristics of the known impact wrenches described in the above mentioned Japanese Utility Model Application Laid-open Publication Jikkai Sho 61-81878 and Japanese Patent Application Laid-open Publication Kokai Sho 61-4676, respectively.

In the known impact wrench in which the rotary transformer is used, the fluctuation of the detected torque was increased in accordance with the increase in the number of usages as shown by the curve C in FIG. 8 although the repelling force is small as shown in FIG. 9. In the known impact wrench in which the planetary reduction gear is used, the repelling force is very large as illustrated by the curve B in FIG. 9 although the fluctuation of the detected torque is small as illustrated in FIG. 8. In the impact wrench according to the present invention the fluctuation of the detected torque as well as the repelling force are very small as shown by the curves A in FIGS. 8 and 9.

The present invention is not limited to the embodiment explained above, but many modifications and alternations may be conceived by those skilled in the art within the scope of the invention. For instance, in the above embodiment, the change of the magnetic permeability produced in the outer surface of the main spindle made of magnetic strictive material is detected by the coils, but this change may be detected by other magneto-electric transducing means such as magneto-resistance element and Hall element. Further, in the above embodiment, the sinusoidal torque detection signal is sampled and held at its peak, but according to the invention, the torque detection signal may be sampled and held at any desired phase point which is fixedly related to the exciting current As explained above in detail, in the impact wrench according to the present invention, the clamping torque applied to the main spindle is detected by detecting the change in the magnetic permeability of the main spindle with the aid of the magneto-electric transducing means and the detected torque signal is sampled and held at a predetermined phase. Therefore, the torque applied to the main spindle can be detected without being affected by the vibration of the main spindle and the high accuracy of the torque detection can be maintained for a very long time.

What is claimed is:

1. An impact wrench with the torque controlling faculty comprising:

a main housing;

a main spindle arranged rotatably and made of material having a magnetic strictive effect;

an air motor unit including an eccentric cylinder, a rotary driving shaft arranged rotatably within said eccentric cylinder and vanes secured to said rotary driving shaft;

an air supply unit including an air conduit for supplying a compressed air to said eccentric cylinder of the air motor unit to rotate said rotary driving shaft;

a shut-off valve provided in said air supply unit for selectively cutting a supply of the compressed air to said eccentric cylinder of the air motor unit;

an oil pressure pulse generating unit provided between said main spindle and said rotary driving shaft of the air motor unit for converting a primary torque of the rotary driving shaft into a pulsatory secondary torque which is applied to said main spindle and has a first frequency;

a transducing means including a magneto-electric converting means for detecting a change in a permeability of a surface portion of the main spindle, an exciting current generating means for generating an exiting current which is supplied to said magneto-electric converting means and has a predetermined second frequency which is higher than said first frequency, and a detecting means connected to said magneto-electric converting means for detecting a change of said exciting current to produce a torque detection signal which represents a pulsatory change of a torque applied to said main spindle;

a signal processing circuit connected to said detecting means for sampling and holding said torque detection signal at a predetermined constant phase to generate a torque measurement signal;

a control circuit for receiving said torque measurement signal to produce a valve cut command when the torque measurement signal exceeds a predetermined threshold value;

a pilot valve connected to said shut-off valve and having an electromagnet for driving the pilot valve; and a signal transmitting means for supplying said valve cut command to said electromagnet of the pilot valve to close said shut-off valve.

2. An impact wrench according to claim 1, wherein said magneto-electric converting means comprises first and second coils secured to said main housing and arranged side by side viewed in an axial direction of the main spindle such that the coils are opposed to said surface portion of said main spindle.

3. An impact wrench according to claim 2, wherein said main spindle has formed first and second arrays of recesses formed in said surface portion, said first and second arrays of recesses being opposed to said first and second coils, respectively, the recesses of the first array are inclined with respect to the axial direction of the main spindle by a first inclination angle and the recesses of the second array are inclined with respect to the axial direction of the main spindle by a second inclination angle which is opposite to the first inclination angle.

4. An impact wrench according to claim 3, wherein said transducing means further comprises first and second resistors which constitute a bridge circuit together with the first and second coils, said exciting current generating means is constructed to generate the exciting current having a sinusoidal waveform which is supplied to a first set of diagonal points of said bridge circuit, and said detecting means comprises a differential amplifier having input terminals connected to a second set of diagonal points of said bridge circuit and having an output terminal for producing said torque detection signal.

5. An impact wrench according to claim 4, wherein said signal processing circuit comprises a sampling pulse generating circuit connected to said exciting current generating means and generating a sampling pulse whose phase is fixedly related to a phase of said exciting current, and a sample and hold circuit for sampling and holding said torque detection signal generated by said differential amplifier in accordance with said sampling pulse to produce said torque measurement signal.

6. An impact wrench according to claim 5, wherein said second frequency of the exciting current is set to higher than 1 KHz.

7. An impact wrench according to claim 6, wherein said signal processing circuit comprises a controller and said means for closing the shut-off valve in response to the valve cut command comprises an electric conductor for connecting said controller to said main housing and an electromagnet which is provided in said main housing and is energized by said valve cut command to close said shut-off valve.

8. An impact wrench according to claim 7, wherein said controller comprises a display panel for displaying a torque represented by said torque measurement signal.

9. An impact wrench according to claim 8, wherein said controller comprises a means for changing said predetermined threshold value.

* * * * *